US008732686B2

(12) United States Patent
Serebryany

(10) Patent No.: US 8,732,686 B2
(45) Date of Patent: May 20, 2014

(54) GENERATING OPTIMAL INSTRUCTION SEQUENCES FOR BITWISE LOGICAL EXPRESSIONS

(75) Inventor: Konstantin S. Serebryany, Moscow (RU)

(73) Assignee: Intel Corporation, Santa Clara, CA (US)

(*) Notice: Subject to any disclaimer, the term of this patent is extended or adjusted under 35 U.S.C. 154(b) by 1510 days.

(21) Appl. No.: 12/308,479

(22) PCT Filed: Jun. 30, 2006

(86) PCT No.: PCT/RU2006/000346
§ 371 (c)(1),
(2), (4) Date: Jun. 29, 2010

(87) PCT Pub. No.: WO2008/002177
PCT Pub. Date: Jan. 3, 2008

(65) Prior Publication Data
US 2010/0275192 A1    Oct. 28, 2010

(51) Int. Cl.
*G06F 9/45* (2006.01)
(52) U.S. Cl.
USPC .......................................................... 717/151
(58) Field of Classification Search
USPC .......................................................... 717/151
See application file for complete search history.

(56) References Cited

U.S. PATENT DOCUMENTS

2005/0216899 A1*    9/2005    Muthukumar et al. ....... 717/151

OTHER PUBLICATIONS

Hatcher et al; ("High-quality code generation via bottom-up tree pattern matching");1986;Proceddings of the 13th ACM sigact-sigplan symposium on principles of programming languages; pp. 119-130.*
Wu et al.; Efficient Boolean matching algorith for cell libraries; 1994 Computer Design: VLSI in computers and processors, IEEE Comput. SOC; p. 36-39).*

(Continued)

*Primary Examiner* — Li B Zhen
*Assistant Examiner* — Bradford Wheaton
(74) *Attorney, Agent, or Firm* — Blakey, Sokoloff, Taylor & Zafman LLP

(57) ABSTRACT

A sequence generator generates a table of optimal instruction sequences for all bitwise expression having a specific number of variables. An index generator generates a bit-string index that corresponds to a particular bitwise expression. The bit-string is generated from a truth table. A table lookup unit is coupled with the index generator. The table lookup unit finds an optimal instruction sequence for the bitwise expression from within the table of optimal instruction sequences based at least in part on the generated bit-string index.

16 Claims, 3 Drawing Sheets

(56) References Cited

OTHER PUBLICATIONS

Hatcher, et al., "High-Quality Code Generation via Bottom-Up Tree Pattern Matching", *POPL '86: Proc. of the 13th ACM SIGACT-SIGPLAN Symposium on Principles of Programming Languages* [online], 1986, pp. 119-130; XP002432077; *ACM Press*, NY, NY, USA, Retrieved from the Internet on May 3, 2007: http://doi.acm.org/10.1145/512644.512655.

Krumme, et al., "A Practical Method for Code Generation Based on Exhaustive Search", *SIGPLAN Notices, Assoc. for Computing Machinery*, NY, NY, vol. 17, No. 6, Jun. 1982, pp. 185-196, XP008057657, ISSN: 0362-1340.

Massalin, "Superoptimizer—a Look at the Smallest Program", *Proc. of the 2nd Int'l Conf. on Architectural Support for Programming Languages & Operating Systems (ASPLOS II)* (Cat. No. 87CH2440-6), IEEE Comput. Soc. Press, WA DC, 1987 pp. 122-126, XP002432076, ISBN: 0-8186-0805-6.

Schlichtmann, et al., "Efficient Boolean Matching in Technology Mapping with Very Large Cell Libraries", *Custom Integrated Circuits Conference*, 1993, *Proc. of the IEEE* 1993 San Diego, CA, May 9-12, 1993, pp. 361-366, XP010222056, ISBN: 0-7803-0826-3.

Wu, Q, et al., "Efficient Boolean Matching Algorithm for Cell Libraries", *Computer Design: VLSI in Computers & Processors*, 1994, *ICCD '94, Proc. IEEE Int'l Conf.* on . . . Cambridge, MA, Oct. 10-12, 1994, Los Alamitos, CA, IEEE Computer Society Oct. 10, 1994, pp. 36-39, XP010100284, ISBN: 0-8186-6565-3.

\* cited by examiner

Table 100

| | Example 1 | Example 2 | Example 3 |
|---|---|---|---|
| Input Expression | (~A)\|(~B) | (A&B)&(~(C&D))\|(~(A&B)&(C&D) | (B&C)\|A)^(B&C) |
| Optimal Sequence | T1 = AND (A, B)<br>R = XOR (T1, ~0) | T1 = AND (A, B)<br>T2 = AND (C, D)<br>R = XOR (T1, T2) | T1 = AND (B, C)<br>T2 = OR (T1, A)<br>R = XOR (T1, T2) |
| DAG |  |  |  |

GENERATING OPTIMAL INSTRUCTION SEQUENCES FOR BITWISE LOGICAL EXPRESSIONS

CLAIM FOR PRIORITY

This patent application is a National Phase application under 35 U.S.C. §371 of International Application No. PCT/RU2006/000346, filed on Jun. 30, 2006, entitled "Generating Optimal Instruction Sequences for Bitwise Logical Expressions."

FIELD

Embodiments of the invention relate to code optimization, and more particularly to generating optimal instruction sequences for bitwise logical expressions.

BACKGROUND

Most computer architectures and their corresponding instruction sets perform binary operations called bitwise operations. Bitwise operations are statements that contain two operands joined by a bitwise operator. The operation result is a numeric value, usually in binary form. For example, the 64-bit Intel Architecture (IA-64) has four operations: AND (A&B), OR (A|B), XOR (A^B), and ANDCM (A & (~B)). The 32-bit Intel Architecture (IA-32) has only three operations: AND, OR, and XOR (although the Streaming Single Instruction Multiple Data (SIMD) Extensions 3 (SSE3) instruction set includes all four operations). Bitwise expressions are statements that represent bitwise operations. In general, optimization of an arbitrary bitwise expression is Non-deterministic Polynomial-time (NP) hard.

The name "compiler" is primarily used for programs that translate a program written in a high level language, typically referred to as source code, into an executable program represented in a lower level language (e.g., assembly language or machine language), typically referred to as object code. Compiler optimization is the process of tuning the output of a compiler to minimize some attribute (or maximize the efficiency) of the object code. The most common requirement in compiler optimizations is to minimize the time taken to execute the object code. One way to minimize the time taken to execute a program is to minimize the number of instructions needed to compute the value of an expression. In traditional compiler science, circuit design associated with compilers and optimizations does not distinguish between expressions having large numbers of variables (e.g., more than 5) and expressions having a small number of variables. Computer programmers frequently employ a single hard-coded pattern for optimizing instructions associated with expressions having both large and small numbers of variables. This universal approach allows a compiler to affect a wide range of expressions, but does not necessarily minimize the complexity and/or the latency of the code associated with a particular expression, including an expression having a small number of variables.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Embodiments of the invention described herein relate to linear-time optimal code generation for bitwise expressions of a small number of variables. Any bitwise expression can be considered a Boolean function/expression. In mathematics, a finite Boolean function is a function of the form f: $B^k \rightarrow B$, where $B=\{0, 1\}$ is a Boolean domain and where k is a non-negative integer. In the case where k=0, the "function" is simply a constant element of B. More generally, a function of the form f: $X \rightarrow B$, where X is an arbitrary set, is a Boolean-valued function. If $X=M=\{1, 2, 3, \ldots\}$, then f is a binary sequence, that is, an infinite sequence of 0's and 1's. If $X=[k]=\{1, 2, 3, \ldots, k\}$, then f is binary sequence of length k.

A Boolean function on n variables can be represented as a bit-string of $2^n$ bits, corresponding to the truth table (a mathematical table used in logic to determine whether an expression is true or valid) for the function. There are $2^{(2^n)}$ different Boolean functions on n variables. For example, for n=4, there are 65,536 Boolean functions; for n=5, there are 4,294,967,296 Boolean functions. The bit-string representing a Boolean function can be considered as the function's index, having a range from 0 to $(2^{(2^n)})-1$. A linear algorithm is used to compute the index of the given Boolean function/expression. The computed index is then used to lookup a table entry that identifies an optimal instruction sequence (discussed in detail below). Thus, an entry with index N represents an optimal instruction sequence for Boolean function N.

As mentioned above, the index for a given function is used to lookup a table entry. Entries in the table contain optimal instruction sequences. In an embodiment associated with bitwise expressions having four (4) variables, the table will consist of 65,536 different entries. A sequence generator may be used to generate the table of optimal instruction sequences (discussed in further detail below). Or, the table of optimal sequences may be imported from an external source.

Optimality of an instruction sequence for a given bitwise expression is defined by the following requirements: 1) the number of instructions for the bitwise expression must be minimal (minimal complexity), and 2) the height of a directed acyclic graph (DAG) formed by the instruction sequence must be minimal (minimal height). A DAG is a directed graph with no directed cycles. This means that for any vertex v, there is no nonempty directed path starting and ending on v.

Figure 1:
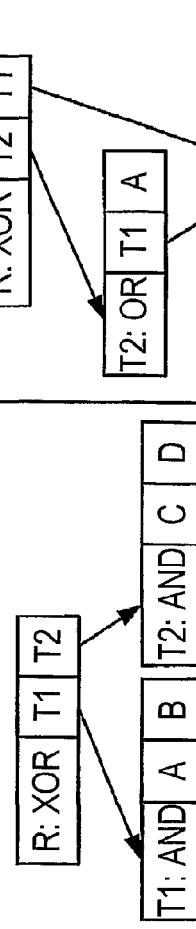
FIG. 1 is a table illustrating the relationship between an optimal instruction sequence and a directed acyclic graph (DAG) according to an embodiment of the invention.
Figure 1:
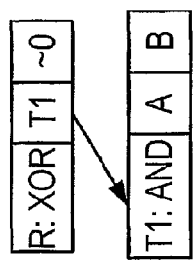
Figure 1:
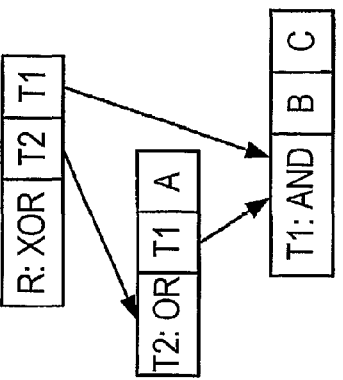

FIG. 1 illustrates three (3) examples of optimal instruction sequences for a set of input expressions. The DAG in each example visually illustrates the requirements (minimal complexity and minimal height) for optimality of the respective instruction sequence. In Example 1, the complexity of the DAG is two (2) (because there are two instructions). The height of the DAG is also two (2) (because the DAG is one (1) level deeper than the level of the root node). In Example 2, the DAG has a complexity of three (3) and a height of two (2). The DAG of Example 3 has a complexity of three (3) and a height of three (3).

As mentioned above, a sequence generator generates a table of $2^{(2^n)}$ optimal instruction sequences. A standard algorithm is used to generate the table of optimal instruction sequences. In one embodiment, the sequence generator includes an algorithm that iterates through all possible permutations of n variables and all possible permutations of instructions having n variables based on the IA-64 instruction set, developed by Intel Corporation of Santa Clara, Calif. In other embodiments, the algorithm may be based on other instruction sets, such as the IA-32 instruction set (also developed by Intel Corporation of Santa Clara, Calif.) The algorithm then iterates through all associated DAGs to determine an optimal instruction sequence for each entry in the table. The table of optimal instruction sequences need only be generated once, after which the table is stored, for example, in a memory or cache (to be accessed during a table lookup.)

Figure 2:
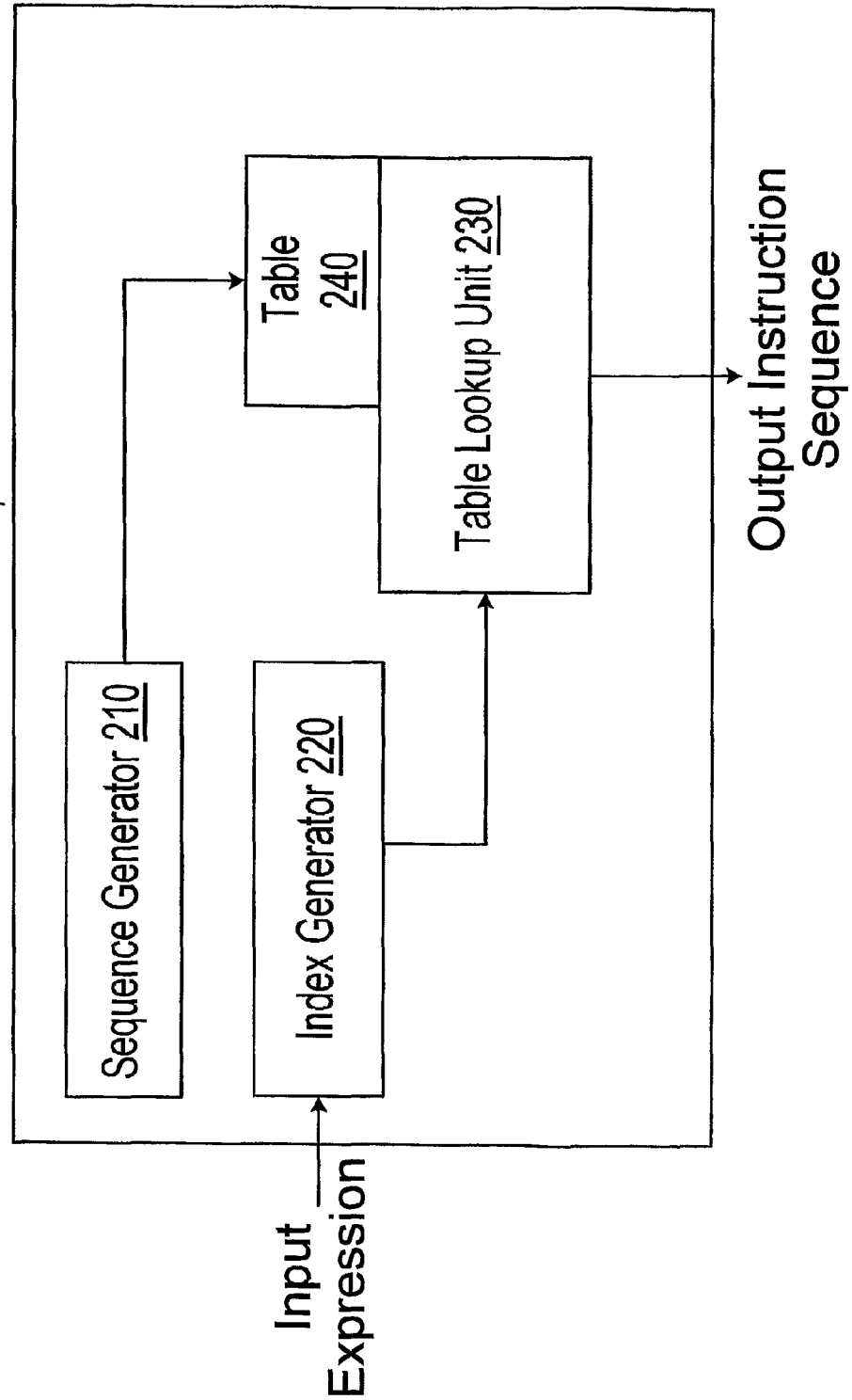
FIG. 2 is a block diagram illustrating an embodiment of a code generator.

FIG. 2 illustrates an embodiment of a code generator 200. Sequence generator 210 generates $2^{(2^n)}$ instruction sequences for all bitwise expressions having n variables. The optimal instruction sequences are stored in table 240, which can be implemented using any type of memory, including SRAM, DRAM, Flash, PROM, EPROM, etc.

An input expression is received at an index generator 220. Index generator 220 determines a Boolean function associated with the bitwise expression. Each variable in the Boolean function is considered an "essential variable" and is assigned/associated with a single bit in a bit-string of length n, with a maximum of one variable per bit. Lower-order bits are assigned before higher-order bits in the bit-string. More specifically, a first variable is assigned to the lowest-order bit in the bit-string; the next variable is assigned to the next lowest-order bit of the bit string. This process continues until the last variable is assigned to the lowest-order bit still available.

The essential variables in the bit-string can be arranged in any order. For example, where n=4 and there are four variables (A, B, C, and D, respectively) in the input expression, the bit-string may be ordered as ABCD, BCDA, or any other order. However, if n=4 and there are only three essential variables (E, F, and G, respectively) in the input expression, the three essential variables are assigned to the three lowest-order bits of the bit-string. A non-essential variable, or placeholder, (e.g., X) is then assigned to the highest-order bit of the bit-string. Thus, the essential variables can be in any order as long any non-essential variables (e.g., X) occupy the highest-order bits (e.g., XGFE, XEGF, XFEG, etc.)

Once the variables for the Boolean function have been arranged as a bit-string, the index generator 220 generates a truth table for the Boolean function. A truth table is generated by determining whether the Boolean function is TRUE (i.e., a logical 1) or FALSE (i.e., a logical 0) given a set of binary input values for the variables in the bit-string. For example, the Boolean function of Example 3 in FIG. 1 has three (3) essential variables. For n=4, there are sixteen (16) different permutations of the four (4) variables in the bit-string. Thus, there are sixteen (16) total results for the sixteen (16) different permutations of the bit-string. The results, in binary form, form the index of the Boolean function. For example, the index of the Boolean function of Example 3 in FIG. 1 is 0101010001010100. Having calculated the index for the Boolean function, the index generator sends the index to table lookup unit 230.

Table lookup unit 230 uses the received index to lookup an entry in table 240. In one embodiment, table lookup unit 230 performs a direct table lookup to find an entry in the table. In other embodiments, table lookup unit 230 may perform a hash table lookup or other form of table lookup. The instruction sequence found by performing the table lookup is the optimal instruction sequence for the input expression.

Figure 3:
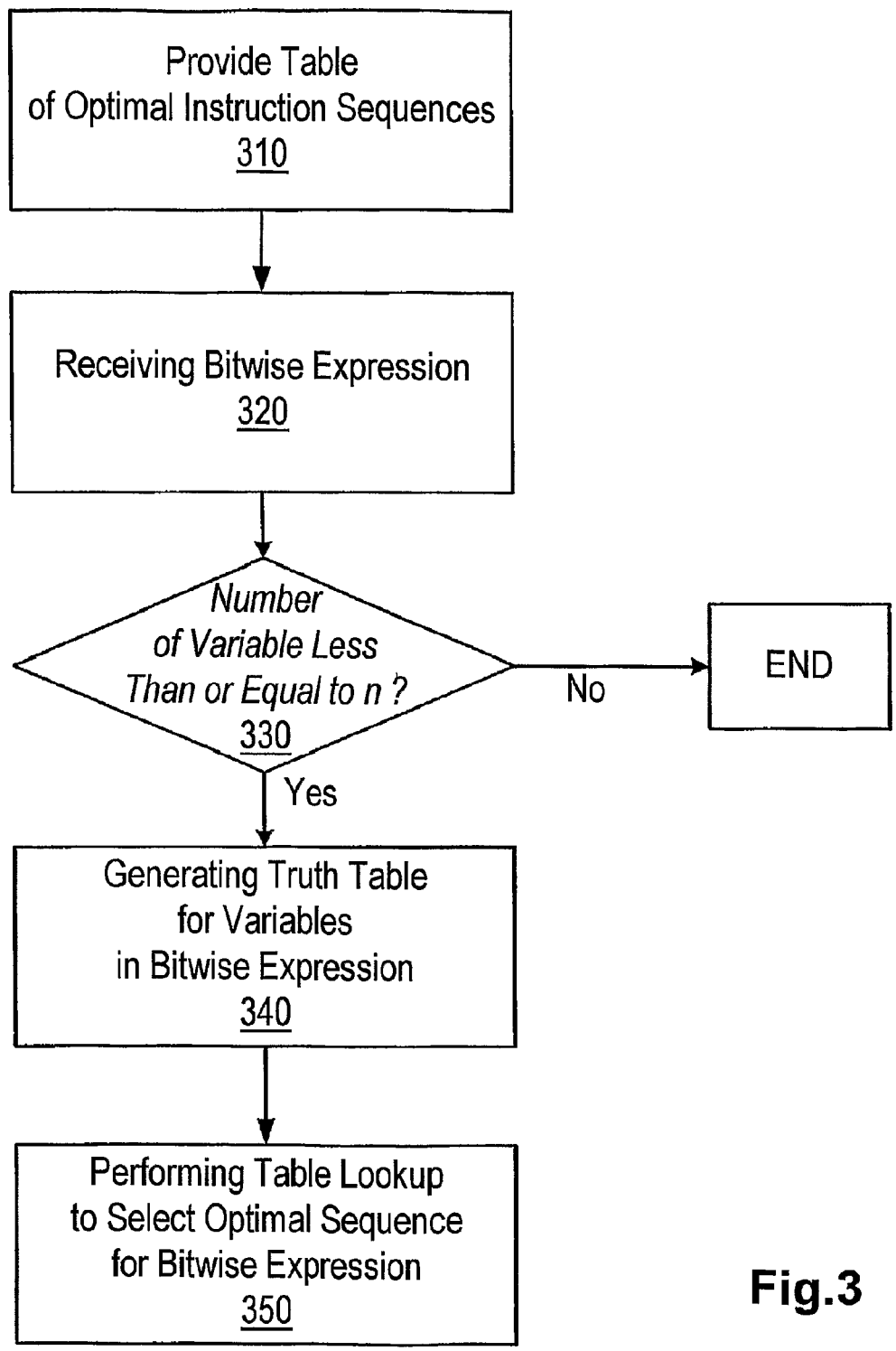
FIG. 3 is a flow diagram illustrating an embodiment of the invention that optimizes code for a bitwise expression.

FIG. 3 illustrates an embodiment of the invention that optimizes code for a bitwise expression. A table of optimal instruction sequences is provided 310. In one embodiment, the table of optimal sequences is provided by a sequence generator that generates the optimal sequences and places them in the table. In another embodiment, the table of optimal sequences is provided by downloading or importing pre-computed table entries from an external source.

A code generator receives an input bitwise expression 320. The generator then determines, 330, whether the number of variables in the received expression is less than or equal to a pre-defined number, n. If not, the expression is discarded or ignored by the generator (but a sub-expression of the larger expression may still be optimized). If the number of variables in the expression is less than or equal to n, then each variable is assigned to a bit in a bit-string of length n. Lower-order bits are reserved for essential variables. A variable is essential if the value of an expression depends on the value of the variable.

Once variables have been assigned in the bit-string, a truth table is generated for the bit-string using a Boolean function that is mathematically equivalent to the input expression 340. The resulting truth table forms an index of length $2^n$. Using the index, the code generator performs a table lookup to select an optimal instruction sequence for the bitwise expression 350. The table lookup can be a direct table lookup, a hash table lookup, or any other table lookup.

Embodiments of the invention described above may include hardware, software, and/or a combination of these. In a case where an embodiment includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc. The machine accessible medium may further include an electronic device having code loaded on a storage that may be executed when the electronic device is in operation. Thus, delivering an electronic device with such code may be understood as providing the article of manufacture with such content described above.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. The above descriptions of certain details and implementations, including the description of the figures, may depict some or all of the embodiments described above, as well as discussing other potential embodiments or implementations of the inventive concepts presented herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A hardware memory including a code generator for bitwise expressions, comprising:
   a sequence generator to generate optimal instruction sequences for the bitwise expressions and to populate a table with the optimal instruction sequences;
   an index generator to generate a bit-string index for a bitwise expression based at least in part on a truth table corresponding to the bitwise expression; and
   a table lookup unit coupled with the index generator to find an optimal instruction sequence for the bitwise expression from the table of optimal instruction sequences based at least in part on the bit-string index,
   wherein the optimal instruction sequence comprises a minimal number of instructions for computing the bitwise expression, and
   wherein a directed acyclic graph (DAG) corresponding to the optimal instruction sequence has a minimal height compared to other DAGs having the minimal number of instructions.

2. The hardware memory of claim 1, wherein the table lookup unit is operable to be accessed via direct table lookup.

3. The hardware memory of claim 1, wherein the table lookup unit is operable to be accessed via hash table lookup.

4. A method performed by a processor for generating code for bitwise computation of bitwise expressions, comprising:
   receiving a bitwise expression having a plurality of variables that is less than or equal to a pre-defined number, and
   for each variable in the bitwise expression,
   assigning the variable to a lowest-order available bit in a bit-string having a bit-length equal to the pre-defined number;
   generating a truth table for the bit-string based at least in part on a Boolean function corresponding to the bitwise expression; and
   performing a table lookup in a table of optimal instruction sequences based at least in part on the truth table to select an optimal instruction sequence for the bitwise expression,
   wherein the instruction sequence is optimal if:
     the instruction sequence has a minimal number of instructions for the bitwise expression, and
     a directed acyclic graph (DAG) corresponding to the instruction sequence has a minimal height as compared to other DAGs having the minimal number of instructions.

5. The method of claim 4, wherein the pre-defined number of variables is four (4).

6. The method of claim 4, wherein performing the table lookup comprises performing a direct table lookup.

7. The method of claim 4, wherein performing the table lookup comprises performing a hash table lookup.

8. The method of claim 4, wherein the Boolean function comprises one or more bitwise binary operations selected from the group of bitwise binary operations consisting of AND, OR, exclusive OR (XOR), AND with complement (ANDCM), and a combination thereof.

9. An article of manufacture comprising a non-transitory machine-accessible medium having content to provide instructions to result in an electronic device performing operations that enable a compiler to minimize instructions for computing a bitwise expression, including:
   determining a Boolean function for the bitwise expression;
   generating an index from a truth table corresponding to the Boolean function; and
   performing a table lookup of pre-determined optimal instruction sequences based at least in part on the index to find an optimal instruction sequence for the bitwise expression,
   wherein the instruction sequence is optimal if:
     the instruction sequence has a minimal number of instructions for the bitwise expression, and
     a directed acyclic graph (DAG) corresponding to the instruction sequence has a minimal height as compared to other DAGs having the minimal number of instructions.

10. The article of manufacture of claim 9, wherein the non-transitory machine accessible-medium includes further content to define the Boolean function as comprising bitwise binary operations selected from the group consisting of AND, OR, exclusive OR (XOR), and a combination thereof.

11. The article of manufacture of claim 9, wherein the non-transitory machine accessible-medium includes further content to define the Boolean function as comprising bitwise binary operations selected from the group consisting of AND, OR, exclusive OR (XOR), AND with complement (ANDCM), and a combination thereof.

12. The article of manufacture of claim 9, wherein performing the table lookup comprises performing a direct table lookup.

13. The article of manufacture of claim 9, wherein performing the table lookup comprises performing a hash table lookup.

14. A system, comprising:
    a sequence generator to generate optimal instruction sequences for all bitwise expressions having the number of variables and to populate a table with the optimal instruction sequences;
    a dynamic random access memory (DRAM) coupled to the sequence generator to store the table of optimal instruction sequences;
    an index generator to generate a bit-string index for a bitwise expression based at least in part on a truth table corresponding to the bitwise expression; and
    a table lookup unit coupled with the index generator and the DRAM to find an optimal instruction sequence for the bitwise expression from the table of optimal instruction sequences based at least in part on the bit-string index,
    wherein an instruction sequence is optimal if:
      the instruction sequence requires a minimal number of instructions for computing the bitwise expression, and
      a directed acyclic graph (DAG) corresponding to the instruction sequence has a minimal height compared to other DAGs having the minimal number of instructions.

15. The system of claim 14, wherein the table lookup unit is operable to be accessed via direct table lookup.

16. The system of claim 14, wherein the table lookup unit is operable to be accessed via hash table lookup.

* * * * *